Patented Sept. 1, 1925.

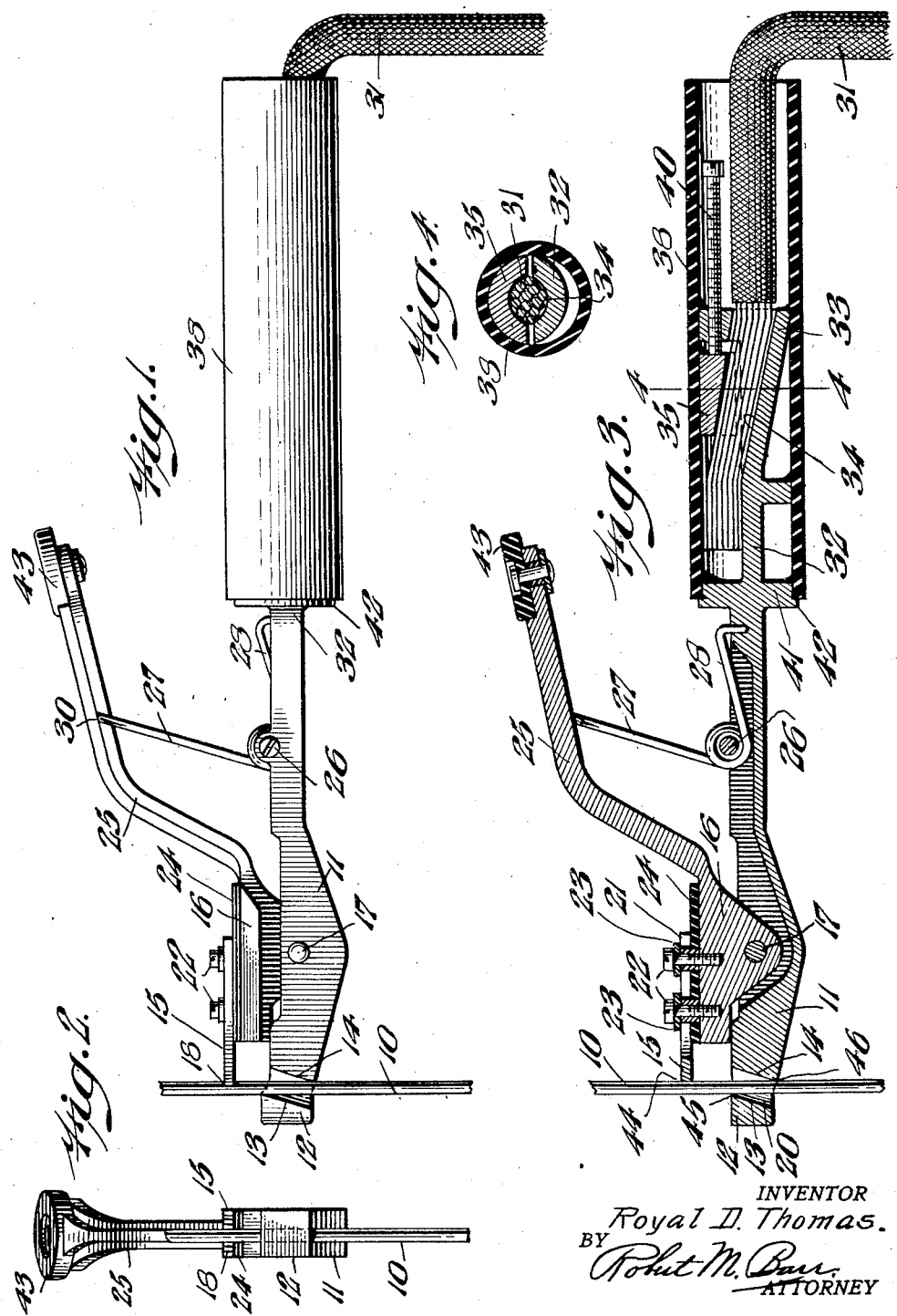

1,552,244

UNITED STATES PATENT OFFICE.

ROYAL D. THOMAS, OF NARBERTH, PENNSYLVANIA.

ELECTRODE HOLDER.

Application filed May 15, 1924. Serial No. 713,516.

*To all whom it may concern:*

Be it known that I, ROYAL D. THOMAS, a citizen of the United States, and a resident of Narberth, Montgomery County, State of Pennsylvania, have invented certain new and useful Improvements in Electrode Holders, of which the following is a specification.

The present invention relates to holders for electrodes, and more particularly to a holder for an electrode used in arc welding equipment.

Some of the objects of the present invention are to provide a holder for an electrode which will rigidly hold the electrode in operating position so that it is impossible for the electrode to work loose or change position when the device is in operation; to provide a holder for arc welding electrodes which is of rugged construction, light in weight, and which can be easily manipulated when in use; to provide an improved means for protecting the user of an electrode holder from heat and from the welding current; to provide a simple and efficient holder for electrodes which is so arranged and constructed that one electrode can be substituted for another quickly and with a minimum loss of time; to provide an improved handle for an electrode holder wherein the terminal of the current carrying cable, as well as the clamping adjuncts thereof, are protected so that accidental contact by the user is prevented; and to provide other improvements as will hereinafter appear.

In the accompanying drawings, Fig. 1 represents a side elevation of an electrode holder embodying one form of the present invention; Fig. 2 represents an end elevation of the same; Fig. 3 represents a longitudinal section of the holder; and Fig. 4 represents a section on line 4—4 of Fig. 3.

Referring to the drawings, one form of the present invention for holding an electrode 10 used for arc welding purposes comprises a body 11 of conducting material, provided with a jaw 12 having spaced abutments 13 and 14 to receive the electrode 10 between them. In the present construction, these abutments are formed by a slot cut in one side of the body 11 and having its sides inclined with respect to the holding or operating position of the electrode 10, though other forms may be employed without departing from the invention.

For the purpose of clamping or rigidly gripping the electrode 10 between the abutments 13 and 14 a movable jaw 15 is provided as a detachable or adjustable part of a movable member 16, mounted for rocking movement upon a pivot 17 which extends transversely of the body 11. The movable jaw 15 is preferably provided with teeth 18 to grip the electrode 10, and for a similar purpose one face of the abutment 13 is also provided with teeth 20 which coact with the opposite side of the electrode from the teeth 18 so that the two gripping faces not only prevent relative lengthwise movement of the electrode but also hold it against lateral or side movement. The jaw 15 is preferably mounted for adjustment toward and away from the position of the electrode 10 by providing it with a slot 21 which straddles two fastening studs 22 threaded into the movable member 16. It is desirable to prevent the heavy operating current from passing through the jaw 15, and to that end the studs 22 are fitted with insulating bushings 23 and the jaw itself is insulated from the member 16 by a strip 24 of insulating material.

As a means for actuating the movable member 16 and for normally holding the jaw 15 in clamping engagement with the electrode 10, the member 16 is provided with a rearwardly extending arm 25, which terminates at a convenient point for operation, as will be later explained. This arm 25 is maintained under pressure of a retraction spring which is coiled about a pin 26 secured to the body 11 with one end 27 pressed against the arm 25 and the other end 28 pressed against the body 11 so that the necessary tension is maintained. Preferably the end of the spring end 27 is shaped as shown at 30 to properly fit the arm 25 to prevent its displacement and also to ride freely on the under surface of the arm 25 as the latter is moved on its pivot 17.

In order to attach the current conveying cable 31 to the body 11 the latter is provided with a shank 32 having its outer end formed with an axially disposed opening 33 through which the cable 31 is arranged to pass in order to seat in a groove 34 inclined with respect to the shank 32 and aligned with the opening 33. This inclined groove 34 causes the end of the cable to take a position at an angle to the axis of the shank and bring it in position to be clamped by a movable wedge block 35, the cable contacting face of which is provided with a groove 36 which gradually decreases in size toward the opening 33. The outer face 37 of the block 35 is shaped to conform to the configuration of the inner face of a tubular handle 38, so that when the latter is placed in its operative position enclosing the end of the shank 32 it will have a snug fit about the block 35. In order that the block 35 may be moved relative to the end of the shank 32 and thereby produce the required wedge clamping action upon the cable 31, the two abutting faces of the block and the shank are formed so that the movable part can ride freely with respect to the shank under the pressure of a feed screw 40 or equivalent means, which is threaded through the end of the shank and bears against one end of the block 35. In connection with the handle construction, it will also be noted that the shank 32 is provided with a head 41 corresponding in contour and size to the shape and dimension of the inside of the handle 38, while a flange 42 is formed integral with the head 41 and has a diameter sufficiently large to act as an abutment for the end of the handle to thus fix its position. That portion of the shank 32 in which the feed screw 40 is located is also of a size to fit within the interior of the handle 38, and the latter can therefore be readily slipped over the shank and fit snugly against the aforesaid abutment flange 42. When the handle 38 is thus in place over the end of the shank 32 it encircles the block 35 so that when the cable 31 has been inserted through the opening 33 into the grooves 34 and 36 a feeding movement transmitted to the screw 40 will cause the block 35 to move relative to the shank 32, and because of wedge action of the two opposed grooves, grip the cable 31 on the one side while being forced into binding engagement with the inside of the handle 38 on the opposite side. In this way the handle is rigidly clamped in place while simultaneously the cable 31 is made fast in good electrical contact with the shank 32.

For protecting the user of the holder from the current, as well as any radiating heat, the handle 38 is formed of insulating material and in its assembled position the extremity of the arm 25 is in such a position that it can be easily operated by the thumb or finger of the hand upon the handle. For preventing direct contact with the arm, it is provided with a thumb piece or button 43 and any pressure thereon is transmitted to the arm to cause the necessary rocking movement thereof.

It will now be apparent that a complete unitary electrode holder has been devised in which one part is arranged to cooperate with or receive an electrode, while another part is movable and acts directly upon the electrode to create a pressure which clamps or binds the electrode in the body. Thus, the electrode 10 can be placed between the abutments 13 and 14 with any desired length thereof extending in the direction of use, and at this time the arm 25 is moved against the action of the spring arm 27 by pressure of the thumb upon the thumb piece 43, and the arm and its parts thus swing in a clockwise direction and move the jaw 15 out of the path of the electrode 10. As soon as the electrode is properly placed the pressure upon the arm is released, and consequently the spring arm 27 returns it toward its normal position and therefore brings the jaw 15 into engagement with the electrode 10. The result is an applied bending moment to the electrode, which causes the electrode to be rigidly held between the abutments 13 and 14. In other words, the electrode is held at three points, 44, 45 and 46, the applied force acting at 44 and the electrode 10 being fulcrumed at 45. Of course, movement of the arm 25 in a direction to withdraw the jaw 15 causes an instant release of the electrode, which can therefore be dropped out or removed and a new electrode quickly substituted.

From the foregoing it will be apparent that the holder of the present invention functions not only to firmly and rigidly retain the electrode in supported operating position but also holds it in such a manner that it can be released and removed from the holder in a minimum of time. Furthermore, the terminal of the conducting cable is securely locked to the body, making a perfect electrode contact, and at the same time this terminal, as well as the associated parts, is enclosed within an insulating handle which protects the user from the current. A desirable feature also of the construction is in the provision of a common means for clamping the conducting cable to the body and also securing the handle at the same time.

While but one form is shown in which this invention may be embodied, it is to be understood that the invention is not limited to any specific construction, but might be applied in various forms without departing from the spirit of the invention or the scope of the appended claims.

Having thus described my invention, I claim:

1. In an electrode holder, the combination of a body providing a two point contact with an electrode, said points being arranged to engage opposite sides of said electrode, a member movable with respect to said body and providing a single point contact with said electrode, and means for applying pressure to said single point contact whereby said electrode is gripped at said three points and rigidly held.

2. In an electrode holder, the combination of a body forming a fulcrum and an abutment, said fulcrum and abutment being spaced to receive an electrode between them, and means acting at a single point on said electrode on the opposite side of said fulcrum from said abutment to cause said electrode to be rigidly held by said body.

3. In an electrode holder, the combination of a body forming a fulcrum and an abutment arranged to receive an electrode between them, and means including a spring pressed jaw acting upon said electrode at a single point on the opposite side from the fulcrum to clamp said electrode.

4. In an electrode holder, the combination of a body forming a fulcrum and an abutment arranged to receive an electrode between them, and means including an adjustable jaw acting upon said electrode at a single point on the opposite side from the fulcrum to clamp said electrode.

5. In an electrode holder, the combination of a body, means operating in conjunction with said body for clamping an electrode in operative position, a handle for said body, means on said body for receiving a cable terminal, and common means for clamping said terminal and said handle to said body.

6. In an electrode holder, the combination of a body, means operating in conjunction with said body for clamping an electrode in operative position, a handle for said body, means on said body for receiving a cable terminal, and means including a wedge member for simultaneously clamping said terminal and said handle to said body.

7. In an electrode holder, the combination of a body having an inclined receiving opening for a cable terminal, a member encircling said opening and terminal, a wedge block arranged to coact with said member and engaging said terminal, and means to move said block to create a clamping action upon said terminal.

Signed at Philadelphia, in the county of Philadelphia, and State of Pennsylvania, this 28th day of April, 1924.

ROYAL D. THOMAS.